United States Patent [19]
Lummis

[11] Patent Number: 6,058,645
[45] Date of Patent: May 9, 2000

[54] FISHING LURE

[75] Inventor: Michael G. Lummis, Kalamazoo, Mich.

[73] Assignee: LMN Enterprises, Inc., Kalamazoo, Mich.

[21] Appl. No.: 09/345,861

[22] Filed: Jul. 1, 1999

[51] Int. Cl.$^7$ .................................................... A01K 85/00
[52] U.S. Cl. .............................................................. 43/42.33
[58] Field of Search .............................. 43/42.32, 42.33, 43/42.34, 42.53, 42.45, 42.48

[56] References Cited

U.S. PATENT DOCUMENTS

| | | |
|---|---|---|
| 810,017 | 1/1906 | Ackerman . |
| 1,955,408 | 4/1934 | Chapleau et al. . |
| 2,573,399 | 10/1951 | Cannon . |
| 2,611,209 | 9/1952 | Pond . |
| 3,015,904 | 1/1962 | Trani . |
| 3,367,057 | 2/1968 | Pond . |

*Primary Examiner*—Thomas Price
*Attorney, Agent, or Firm*—Flynn, Thiel, Boutell & Tanis, P.C.

[57] ABSTRACT

An elongate fishing lure having an elongate and buoyant material core, a single elongate strand of wire of a finite length having a first eyelet at a first end thereof, a second eyelet at a second end thereof and a third eyelet at a location intermediate the first and second ends. A body encasing the core while simultaneously maintaining the first, second and third eyelets exposed relative to an exterior of the body is provided so as to facilitate the connection of each eyelet to one of hooks and fishing line. First and second side plates separate from the body are conformed in shape to the body and oriented flush with respect to the exterior surface of the body are mounted on the body. Each of the first and second side plates has at least one of a plurality of pins and pin receiving sockets thereon with the pin on the respective side plate extending through a hole in the body with a distal end thereof being received in the pin receiving socket on the other side plate. Fastening device for fastening the distal end of each of the pins in the pin receiving sockets is provided. As a result, the side plate fastening to the fishing lure is independent of the material of the body of the fishing lure.

15 Claims, 1 Drawing Sheet

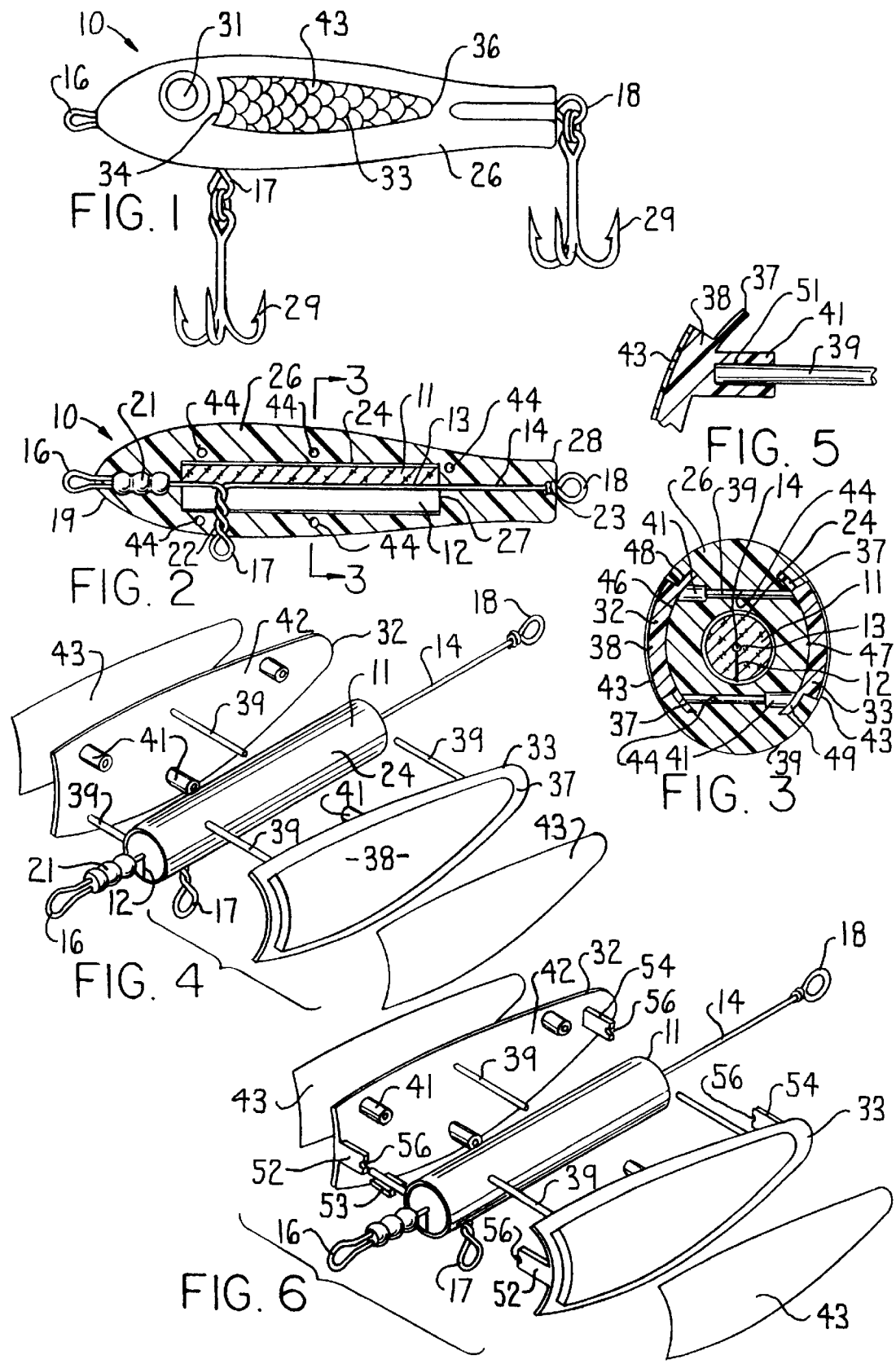

FISHING LURE

FIELD OF THE INVENTION

This invention relates to a fishing lure and, more particularly, to a soft body fishing lure with hard plastic decorative and light reflecting side panels affixed thereto.

BACKGROUND OF THE INVENTION

A fishing lure is known that has the overall shape as the fishing lure illustrated in FIG. 1 of this application. The fishing lure that is known does not have decorative and light reflecting side panels but, instead, is made of a soft pliable material that extends from the nose of the lure to the tail thereof and encases a relatively stiff core. This lure also consists of an internally extending elongate wire that is plastically deformable to facilitate a configuring of the soft body lure to facilitate an achievement of the desired action of the lure in the water by the fisherman.

The invention disclosed herein is directed to the addition of decorative side panels, particularly, light reflecting side panels that are affixed to the fishing lure so that light will be reflected from the fishing lure as the fisherman works the lure in the water. Since the material of the lure is soft and pliable, the addition of the reflective side panels has not been an obvious thing to do and the invention disclosed herein is directed to the solution to the problem of securing the side panels to a fishing lure made of a soft pliable material. The problem of securing the side panels to the soft pliable material is further enhanced by reason of the fact that the side panels are of a hard plastic material incapable of flexing to the degree that the soft pliable material is capable of flexing.

SUMMARY OF THE INVENTION

The objects and purposes of the invention are met by providing an elongate fishing lure having an elongate and buoyant material core, a single elongate strand of wire of a finite length having a first eyelet at a first end thereof, a second eyelet at a second end thereof and a third eyelet at a location intermediate the first and second ends. The core has a lengthwise extending passageway therethrough receiving the wire therein so that the first and second ends with the respective first and second eyelets thereat and the third eyelet are exposed. A body encasing the core while simultaneously maintaining the first, second and third eyelets exposed relative to an exterior of the body is provided so as to facilitate the connection of each eyelet to one of hooks and fishing line. A plurality of through holes are provided in the fishing lure and extend in a direction transverse to a longitudinal axis of a fishing lure. First and second side plates separate from the body are conformed in shape to the body and oriented flush with respect to the exterior surface of the body and are mounted on the body. Each of the first and second side plates has at least one of a plurality of pins and pin receiving sockets thereon with the pin on a respective side plate extending through one of the holes in the body with a distal end thereof being received in the pin receiving socket on the other side plate. Fastening means, such as a mechanical fastener or an adhesive, for fastening the distal end of each of the pins in the pin receiving sockets is provided. As a result, the side plate fastening to the fishing lure is independent of the material of the body of the fishing lure.

BRIEF DESCRIPTION OF THE DRAWINGS

In the drawings:

FIG. 1 is a side view of the fishing lure embodying the invention;

FIG. 2 is a longitudinal sectional view through the fishing lure;

FIG. 3 is a sectional view taken along the line 3—3 of FIG. 2;

FIG. 4 is an exploded perspective view of a first embodiment of the side plates relative to the core;

FIG. 5 is a fragmentary enlargement of FIG. 3; and

FIG. 6 is an exploded perspective view of a second embodiment of the side plates relative to the core.

DETAILED DESCRIPTION

A fishing lure 10 embodying the invention is illustrated in the drawing. The fishing lure 10 includes a central buoyant cork material core 11 that is, in this particular embodiment, elongate and cylindrical in cross section as illustrated in FIG. 3. The core 11 has a longitudinally extending slit 12 therein which extends from the periphery radially inwardly to the central region 13 thereof.

An elongate strand of plastically bendable wire 14 is provided. The strand of wire 14 is configured by bending and twisting into three eyelets 16, 17 and 18. The eyelet 16 formed at the nose end 19 of the fishing lure 10 is formed by bending the wire into a generally U shape and slipping the legs of the U into a metallic sleeve 21 and fixedly securing as by soldering or by an adhesive the wire 14 to the sleeve 21. The eyelets 17 and 18 are formed by twisting the wire as at 22 and 23, respectively. As is illustrated clearly in FIG. 2, the eyelet 17 is oriented intermediate the eyelets 16 and 18. Further, the eyelets 16 and 18 are oriented on a longitudinal axis congruent with the elongate length of the wire 14 whereas the eyelet 17 is oriented radially offset therefrom. The elongate wire 14 is oriented so that the length thereof is received into the slit 12 and oriented at the central region 13 of the core 11 as illustrated in FIGS. 2 and 3. A foil 24, preferably metallic, is wrapped around the exterior of the core 11 so as to close the slit 12 and prevent the material of the core from expanding in a peripheral direction by reason of the slit 12 being provided therein. An adhesive (not illustrated) is utilized to secure the wire 14 in the central region 13 of the core 11.

The core 11 with the wire 14 oriented thereon is placed into a mold and a soft material, such as polyvinylchloride 26 (PVC) is injection molded around the core and the wire leaving the eyelets 16, 17 and 18 exposed to the exterior surface of the fishing lure as illustrated in FIGS. 1 and 2.

The strand of wire 14 extending between the aft end 27 of the core 11 and the eyelet 18 is plastically deformable so that the tail end 28 can be configured out of axial alignment with the nose end 19 to enhance the desired action of the lure in the water. Hooks 29 are secured to the respective eyelets 17 and 18 whereas a fishing line (not illustrated) is adapted to be connected to the eyelet 16.

An imitation eye 31 is secured, as by an adhesive or other equivalent means, to the left and right sides of the PVC material body 26 on opposite longitudinal sides thereof adjacent the nose end 19 of the fishing lure 10. In the alternative, the eye can be formed as a raised area on the body which is thereafter painted to appear as an eye.

The aforesaid fishing lure construction has been known in the marketplace for some time. This invention is directed to an improvement to that known fishing lure, namely, the addition of hard plastic side panels 32 and 33 to the soft material side walls of the known fishing lure. Each of the side panels 32 and 33 are, as stated above, made of a hard plastic material and has a somewhat elongate triangular configuration, the base of the triangle being oriented adjacent the nose end 19 of the fishing lure and the apex end being oriented adjacent the tail end 28 of the fishing lure. The base end 34 of each side plate 32 and 33 is arcuate, the center point of the arc coinciding closely with the center point of the eye construction 31. The apex ends 36 are oriented approximately in a horizontal plane containing the elongate strand of wire 14. Each side panel is somewhat arcuately shaped to conform to the oval configuration of the PVC body 26 as illustrated in FIG. 3. The perimeter of each side panel 32 and 33 has an outwardly extending thin wall flange 37 that extends around a central thick portion 38.

Each of the side panels 32 and 33 additionally include plural pins 39 and pin receiving sockets 41 integrally formed on an internally facing side 42 thereof. A pin 39 on one side panel projects generally perpendicularly away from the surface 42 on, for example, the side panel 32 and is axially aligned with a pin receiving socket 41 on the other panel, here the side panel 33. The same is true for the pins 39 on the side panel 33 and sockets 41 on the side panel 32.

In the embodiment of FIG. 4 (and the embodiment of FIG. 6 set forth below), the pins 39 straddle the core 11. If the core is made larger to slow down the descent of the lure in the water, appropriate passageways (not shown) can be provided in the core to accommodate the pins and, if necessary, the pin receiving sockets 41. A thin light reflecting material layer 43 is heat bonded or adhesively secured to an exterior facing side of the thick portion 38 of each side panel 32 and 33.

In order for the fishing lure 10 to accommodate the inventive side panel configuration illustrated in FIG. 4, the PVC body 26 is provided with a plurality of pin receiving holes 44. These holes 44 extend in a direction transverse of the longitudinal axis of the fishing lure 10. In addition, and as illustrated in FIG. 3, the PVC body 26 has recesses 46 and 47 in the side walls thereof. The recess 46 has an undercut 48 provided around the perimeter of the recess. Similarly, the recess 47 has an undercut 49 provided around the perimeter thereof. As a result, when the pins 39 and axially aligned pin receiving sockets 41 are received in the holes 44 through the bottom walls of the recesses 46 and 47, the thick central parts 38 of the respective side panels 32 and 33 are received in the respective recesses 47 and 48 with the peripherally extending flange 37 on each thereof being received in the respective undercuts 48 and 49. This configuration orients the exterior surface of the side panels 32 and 33 with the light reflecting layers 43 on the outside surfaces thereof generally flush with the exterior surface of the PVC body 26 as illustrated in FIG. 3. As is illustrated in FIG. 5, an adhesive 51 can be utilized to secure the pin 39 into the pin receiving socket 41. Additionally, it is possible to provide serrations or the like on the exterior surface of the pins 39 to operatively engage the interior surface of the pin receiving sockets 41 to prevent the pins 39 from being pulled out of the sockets.

In the alternative, the side plates 32 and 33 can be preassembled so that the pins 39 straddle the core and in some cases engage the core so as to fix the relative positions thereof. Thereafter, this assembly can be placed into a mold and the PVC material is molded around the assembly.

In this particular embodiment, the exterior facing surface of the light reflecting layers 43 can be provided with hologram configurations to enhance the dispersion of light. Such hologram configurations may have the appearance of fish scales as schematically shown in FIG. 1.

The embodiment of FIG. 6 is similar to the embodiment illustrated in FIG. 4. The only difference between FIGS. 4 and 6 is the provision of plural brace members 52, 53 and 54 being integrally provided on the interior facing sides 42 of the side panels 32 and 33. As a result, the same reference numerals utilized in FIG. 4 are also utilized in FIG. 6 to identify the unchanged components thereof. The brace members 52, 53 and 54 each have a wire receiving notch 56 on the distal ends thereof so that when the pins 39 are received in corresponding pin receiving sockets 41, the distal ends of respective cross members 52 will engage each other so that the strand of wire 14 is received in the respective mated notches 56 thereof. The same thing occurs with resect to the brace members 53 and 54 and their respective notches 56 therein. Furthermore, the brace members 52 and 56 are oriented adjacent the fore and aft ends of the core 11 to thereby assist in holding the side panels 32 and 33 fixed against relative axial movement relative to the core 11. Appropriate additional holes (not shown and near the holes 44) can be provided in the PVC body 26 to accommodate the brace members 52, 53 and 54.

In the alternative, the side plates 32 and 33 can be preassembled so that the pins 39 straddle the core and in some cases engage the core so as to fix the relative positions thereof. Thereafter, this assembly can be placed into a mold and the PVC material is molded around the assembly.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. In an elongate fishing lure having an elongate and buoyant material core, a single elongate strand of wire of a finite length, having a first eyelet at a first end thereof, a second eyelet at a second end thereof and a third eyelet at a location intermediate said first and second ends, said core having a lengthwise extending passageway therethrough receiving said wire therein so that said first and second ends with respective said first and second eyelets thereat and said third eyelet are exposed, and a body encasing said core while simultaneously maintaining said first, second and third eyelets exposed relative to an exterior surface of said body so as to facilitate the connection of each thereof to one of hooks and fishing line, the improvement comprising:

a plurality of through holes extending through the sides of said fishing lure and in a direction transverse of a longitudinal axis of said fishing lure; and first and second side plates separate from said body that are each conformed to and flush with a respective side of said exterior surface of said body, each of said first and second side plates having at least one of a plurality of pins and pin receiving sockets thereon, each said pin on said first side plate extending through one of said holes with a distal end thereof being received in said pin receiving socket on said second side plate; and fastening means for fastening said distal end of each said pin in said pin receiving socket.

2. The fishing lure according to claim 1, wherein said holes extending through said fishing lure are oriented to extend solely through said body and straddle said core and said wire.

3. The fishing lure according to claim 1, wherein said wire has a plastic bending characteristic.

4. The fishing lure according to claim 1, wherein said body is made of a soft pliable material.

5. The fishing lure according to claim 4, wherein said soft pliable material is a polyvinylchloride.

6. The fishing lure according to claim 1, wherein said first and second side plates each include an integral brace member having one half of a wire receiving recess in a distal end thereof, a flush conforming of said side plates to said body effecting an aligned orienting of said distal ends to cause said wire to be received in a wire receiving recess defined by a mating of both of said halves of said wire receiving recess.

7. The fishing lure according to claim 6, wherein additional transversely extending holes are provided in said body and receiving therein said brace members, said additional holes being oriented adjacent fore and aft ends of said core.

8. The fishing lure according to claim 1, wherein said fastening means is an adhesive between said pins and said pin receiving socket.

9. The fishing lure according to claim 1, wherein each of said first and second side plates has on an outwardly facing surface thereof a light reflective surface finish.

10. The fishing lure according to claim 9, wherein said light reflective surface finish is comprised of at least one of a hologram configuration and a prismatic configuration on an adhesively backed tape configured to fit over said outwardly facing surface and be adhesively affixed thereto.

11. The fishing lure according to claim 9, wherein said light reflective surface finish is a tape having at least one of a hologram configuration and a prismatic configuration on an outwardly facing side thereof, said tape being configured to be applicable by heat to said outwardly facing surfaces of said first and second side plates.

12. The fishing lure according to claim 1, wherein lateral sides of said body each have a recess therein conforming in shape and depth to a shape and thickness of said first and second side plates.

13. The fishing lure according to claim 12, wherein said recesses in each side of said body have peripherally extending undercuts thereat, and a peripheral edge of each of said first and second side plates is thinner than a thicker central part thereof, said thinner peripheral edge of each side plate being received in said peripherally extending undercut with said outwardly facing surfaces of said first and second side plates being generally flush with said exterior surface of said body.

14. The fishing lure according to claim 1, wherein said first and second side plates each include an integral brace member having one half of a wire receiving recess in a distal end thereof, a flush conforming of said side plates to said body effecting an aligned orienting of said distal ends to cause said wire to be received in a wire receiving recess defined by a mating of both of said halves of said wire receiving recess, said first and second side plates additionally including a further brace member having one half of a further wire receiving recess in a distal end thereof, a flush conforming of said side plates to said body effecting an aligned orienting of said distal ends of said further brace members to cause said wire adjacent said third eyelet to be received in the further wire receiving recesses defined by a mating of both of said halves of said further wire receiving recesses on said distal ends of said further brace members.

15. The fishing lure according to claim 14, wherein said brace members separate from said further brace members straddle end to end said core.

\* \* \* \* \*